United States Patent
Zhang

(10) Patent No.: US 8,472,420 B2
(45) Date of Patent: Jun. 25, 2013

(54) GATEWAY DEVICE

(75) Inventor: Ya-Fen Zhang, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 175 days.

(21) Appl. No.: 13/103,111

(22) Filed: May 9, 2011

(65) Prior Publication Data

US 2012/0243521 A1 Sep. 27, 2012

(30) Foreign Application Priority Data

Mar. 21, 2011 (CN) .......................... 2011 1 0067465

(51) Int. Cl.
*H04W 4/00* (2009.01)
(52) U.S. Cl.
USPC ............................. 370/338; 370/401; 370/392
(58) Field of Classification Search
USPC ........................................................ 370/338
See application file for complete search history.

(56) References Cited

U.S. PATENT DOCUMENTS

| 7,860,978 | B2 * | 12/2010 | Oba et al. ....................... 709/227 |
| 2008/0244090 | A1 * | 10/2008 | Zhu et al. ....................... 709/242 |
| 2011/0058553 | A1 * | 3/2011 | Brzozowski ................... 370/392 |
| 2012/0218896 | A1 * | 8/2012 | Ygberg et al. ................. 370/235 |

* cited by examiner

*Primary Examiner* — Huy D Vu
*Assistant Examiner* — Kevin Cunningham
(74) *Attorney, Agent, or Firm* — Altis Law Group, Inc.

(57) ABSTRACT

A gateway device includes a local area network (LAN) interface including a plurality of LAN ports, and a processor connected to the LAN interface. The gateway device communicates with an Internet Protocol Version 4 (IPv4) network and at least two Internet Protocol Version 6 (IPv6) networks. All the plurality of LAN ports are classified into a plurality of port groups corresponding to the at least two IPv6 networks. When an IPv6 user device is connected to any one of the plurality of LAN ports, the processor identifies the LAN port connected to the IPv6 user device, and enables the IPv6 user device to communicate with the IPv6 network corresponding to the port group which includes the LAN port connected to the IPv6 user device.

7 Claims, 1 Drawing Sheet

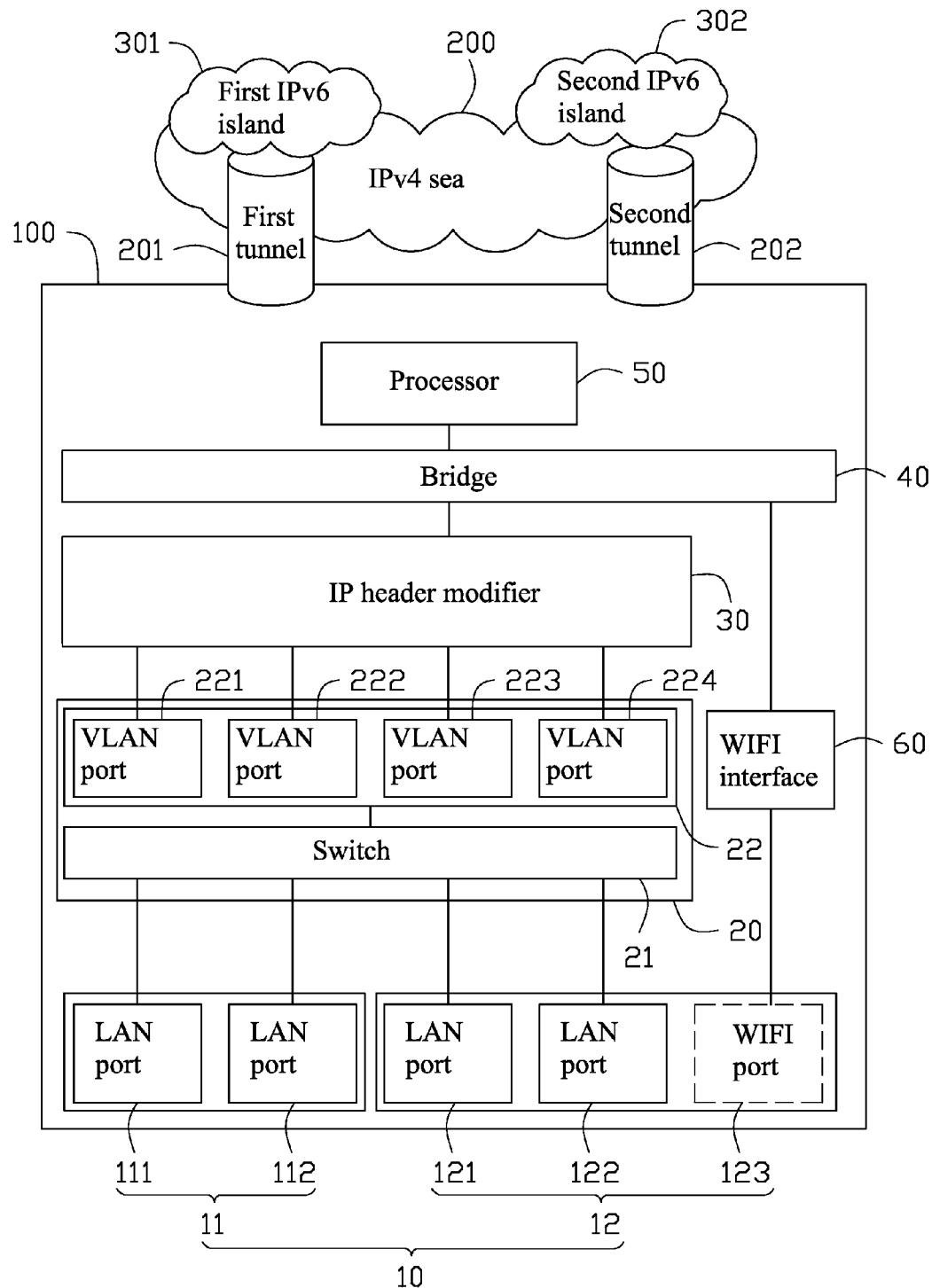

GATEWAY DEVICE

BACKGROUND

1. Technical Field

The present disclosure relates to gateway devices for network communication, and particularly to a gateway device for Internet Protocol Version 6 (IPv6) networks.

2. Description of Related Art

Internet Protocol Version 6 (IPv6) is beginning to replace the currently used Internet Protocol Version 4 (IPv4). However, at present, only some parts of the Internet uses IPv6, while the main part of the Internet still uses IPv4. This situation is described as "IPv6 islands in an IPv4 sea".

IPv6's rapid deployment tunnel technology is often used to enable the main part of Internet using IPv4 (i.e., above IPv4 sea) and the parts of Internet using IPv6 (i.e., above IPv6 islands) to communicate with each other. A gateway device supporting IPv6's rapid deployment tunnel technology can communicate with the IPv6 islands, and client computers in the IPv4 sea can access the IPv6 islands through the gateway device. However, when a gateway device synchronously communicates with more than one IPv6 island using IPv6's rapid deployment tunnel technology, the gateway device may be unable to distinguish Router Solicit (RS) messages for accessing different IPv6 islands sent from client computers. Thus, a plurality of client computers in the IPv4 sea using the gateway device to access the IPv6 islands can only access one of the IPv6 islands through the gateway device, and are unable to respectively access different IPv6 islands through the gateway device.

Therefore, there is room for improvement within the art.

BRIEF DESCRIPTION OF THE DRAWINGS

Many aspects of the present disclosure can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the FIGURES.

The FIGURE is a block diagram of a gateway device, according to an exemplary embodiment.

DETAILED DESCRIPTION

The FIGURE shows a block diagram of a gateway device 100, according to an exemplary embodiment. A main part of the Internet that uses Internet Protocol Version 4 (IPv4) can communicate with parts of the Internet that use Internet Protocol Version 6 (IPv6) through the gateway device 100, and the each client computer in the main part of the Internet using IPv4 can synchronously access at least two parts of Internet using IPv6 through the gateway device 100. Since the main part of the Internet using IPv4 is generally described as "IPv4 sea" and the parts of the Internet using IPv6 are generally described as "IPv6 islands", the FIGURE shows the main part of the Internet using IPv4 as an IPv4 sea 200, and shows two parts of the Internet using IPv6 as a first IPv6 island 301 and a second IPv6 island 302, respectively.

In this embodiment, the IPv4 sea 200 can directly communicate with the gateway device 100 by means of someone or ordinary skill in the art. The gateway device 100 can communicate with the first IPv6 island 301 and a second IPv6 island 302 through a first tunnel 201 and a second tunnel 202 built in the IPv4 sea 200, respectively. The first tunnel 201 and the second tunnel 202 can be built in the IPv4 sea 200 using IPv6's rapid deployment tunnel technology. Thus, user devices (e.g., personal computers and other network terminals) in the IPv4 sea 200 can communicate with the first and second IPv6 islands 301, 302 through the gateway device 100 and the first and second tunnels 201, 202, respectively. If more tunnels for communicating with the gateway device 100 are built in the IPv4 sea 200, the user devices in the IPv4 sea 200 can communicate with more IPv6 islands (not shown) through the gateway device 100 and the additional tunnels.

The gateway device 100 includes a local area network (LAN) interface 10, a virtual local area network (VLAN) module 20, an Internet Protocol (IP) header modifier 30, a bridge 40, and a processor 50. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The LAN interface 10 includes a plurality of LAN ports, and all the plurality of LAN ports are classified into a plurality of port groups corresponding to the IPv6 islands communicating with the gateway device 100. In this embodiment, the LAN interface 10 includes at least four LAN ports 111, 112, 121, 122. The LAN ports 111, 112 are classified into a first port group 11 for communicating with the first IPv6 island 301, and the LAN ports 121, 122 are classified into a second port group 12 for communicating with the second IPv6 island 302. An IPv6 user device (not shown) connected to either the LAN port 111 or the LAN port 122 can communicate with the first IPv6 island 301 through the gateway device 100. The IPv6 user device can be a client computer or other network terminals. Similarly, an IPv6 user device (not shown) connected to either the LAN port 121 or the LAN port 122 can communicate with the second IPv6 island 302 through the gateway device 100. When any one of the LAN ports 111, 112, 121, 122 is connected to an IPv6 user device (not shown), the IPv6 user device can send Router Solicit (RS) messages to and receive Router Advertisement (RA) messages from the gateway device 100.

The VLAN module 20 includes a switch 21 and a VLAN interface 22. The switch 21 is electrically connected to all the LAN ports 111, 112, 121, 122 of the LAN interface 20. The VLAN interface 22 is electrically connected to the switch 21 and includes at least four VLAN ports 221, 222, 223, 224, which respectively correspond to the at least four LAN ports 111, 112, 121, 122. The switch 21 can transmit RS messages received by the LAN ports 111, 112, 121, 122 to the VLAN ports 221, 222, 223, 224 and transmit RA messages sent from the VLAN ports 221, 222, 223, 224 to the LAN ports 111, 112, 121, 122, correspondingly. The switch 21 can add VLAN tags with predetermined values to the RS messages, and the VLAN interface 22 can add VLAN tags with predetermined values to the RA messages. Furthermore, the switch 21 can also delete the VLAN tags added to the RA messages by the VLAN interface 22 before transmitting the RA messages to the LAN ports 111, 112, 121, 122.

In this embodiment, a particular method of using the switch 21 to respectively transmit RS messages received by the LAN ports 111, 112, 121, 122 to the VLAN ports 221, 222, 223, 224 is performed as follows. When an IPv6 user device (not shown) is connected to the LAN interface 10 and sends an RS message to any LAN port 111/112/121/122 of the LAN interface 10, the RS message is transmitted to the switch 21. The switch 21 adds a VLAN tag with a predetermined value corresponding to the LAN port 111/112/121/122 that receives the RS message to the RS message. The RS message having the VLAN tag with the predetermined value is then transmitted to the VLAN interface 20. The VLAN ports 221, 222, 223, 224 are respectively allowed to only receive RS messages having VLAN tags with values corresponding to the LAN ports 111, 112, 121, 122, such that RS messages coming from the LAN ports 111, 112, 121, 122 are respectively transmitted to their corresponding VLAN ports 221, 222, 223, 224. For example, the switch 21 can respectively add VLAN tags with values 1, 2, 4, 8 to RS messages coming from the LAN ports 111, 112, 121, 122. The VLAN ports 221, 222, 223, 224 are respectively allowed to only receive RS messages having VLAN tags with values 1, 2, 4, 8. Thus, RS messages coming from the LAN ports 111, 112, 121, 122 are respectively ensured to be transmitted to the VLAN ports 221, 222, 223, 224.

When an RA message is transmitted to the VLAN module 20 through one of the VLAN ports 221, 222, 223, 224, the VLAN interface 22 adds a VLAN tag with a predetermined value corresponding to the VLAN port 221/222/223/224 receiving the RA message, and transmits the RA message with the VLAN tag to the switch 21. For example, the VLAN interface 22 can respectively add VLAN tags with values 1, 2, 4, 8 to RA messages received by the VLAN ports 221, 222, 223, 224. Upon receiving the RA message, the switch 21 transmits the RA message to the LAN port 111/112/121/122 according to the value of the VLAN tag added to the RA message, and thus the RA message can be received by user devices (e.g., client computers) connected to the LAN port 111/112/121/122. Furthermore, the switch 21 can delete the VLAN tag added to the RA message before transmitting the RA message to the LAN port 111/112/121/122 to decrease data processed by the user devices.

The IP header modifier 30 is connected to all the VLAN ports 221, 222, 223, 224 of the VLAN interface 20. The processor 50 is connected to the IP header modifier 30 through the bridge 40. The IP header modifier 30 can edit the values of traffic class fields of RS messages. When the switch 21 adds the VLAN tags with predetermined values to the RS messages coming from the LAN interface 10, as detailed above, the RS messages having VLAN tags with predetermined values are transmitted to the IP header modifier 30 through the VLAN interface 20. The IP header modifier 30 edits traffic classes of the RS messages according to the VLAN tag values of the RS messages, such that each of the RS message is in a traffic class corresponding to a predetermined VLAN tag value and further corresponding to the LAN port 111/112/121/122 that receives the RS message. The RS messages in the edited traffic classes are then transmitted to the processor 50 through the bridge 40, and thus the processor 50 can detect the VLAN tag value of each of the RS messages according the traffic class of the RS message, and further identify the LAN port 111/112/121/122 that receives the RS message according to the VLAN tag value of the RS message.

When the processor 50 needs to reply a RA message to an IPv6 user device (not shown) connected to any one selected from the LAN port 111/112/121/122, it sets the VLAN interface 221/222/223/224 corresponding to the selected LAN port 111/112/121/122 as the output interface. As above detailed, the VLAN interface 22 adds a VLAN tag with a predetermined value corresponding to the selected LAN port 111/112/121/122 to the RA message and transmits the RA message to the switch 21. Upon receiving the RA message, the switch 21 transmits the RA message to the selected LAN port 111/112/121/122 according to the value of the VLAN tag added to the RA message, and thus the RA message can be received by the IPV6 user device connected to the selected LAN port 111/112/121/122. Furthermore, the switch 21 can delete the VLAN tag added to the RA message before transmitting the RA message to the selected LAN port 111/112/121/122 to decrease data processed by the IPv6 user device.

When the gateway device 100 is used, at first, the processor 50 captures and stores IP addresses of the first and second tunnels 201, 202 in the IPv4 sea 200, and network prefixes of the first and second IPv6 islands 301, 302. Based upon these data, the processor 50 generates and stores IP network addresses of the first and second IPv6 islands 301, 302 in the IPv4 sea 200 by conventional methods.

When an IPv6 user device (not shown) is connected to any LAN port 111/112/121/122 of the LAN interface 10 and sends an RS message through the LAN port 111/112/121/122, the RS message is transmitted to the switch 21. As detailed above, the switch 21 adds a VLAN tag with a predetermined value corresponding to the LAN port 111/112/121/122 that receives the RS message to the RS message. The RS message having the VLAN tag with the predetermined value is then transmitted to the VLAN interface 20 and received by the VLAN port 221/222/223/224 corresponding to the LAN port 111/112/113/114 connected to the IPv6 user device and receiving the RS message. The IP header modifier 30 receives the RS message having the VLAN tag with the predetermined value from VLAN port 221/222/223/224 and edits the value of traffic class field of the RS messages according to the VLAN tag value of the RS message, such that the RS message is in a traffic class corresponding to the LAN port 111/112/121/122 connected to the IPv6 user device and receiving the RS message. The RS message in the edited traffic class is transmitted to the processor 50 through the bridge 40. The processor 50 detects the VLAN tag value of the RS message according the traffic class of the RS message, and further identifies the LAN port 111/112/121/122 connected to the IPv6 user device and receiving the RS message according to the VLAN tag value of the RS message.

Thus, the processor 50 enables the IPv6 user device to communicate with either the first IPv6 island 301 or the second IPv6 island 302 according to the LAN port 111/112/121/122 connected to the IPv6 user device and receiving the RS message. As detailed above, if the IPv6 user device is identified as being connected to any port selected from the first port group 11 (e.g., the LAN port 111/112), the processor 50 generates an RA message comprising the IP network address of the first IPv6 island 301, and assigns the VLAN port 221/222 corresponding to the selected LAN port 111/112 to receive the RA message from the bridge 40. Thus, the VLAN interface 22 adds a VLAN tag with a predetermined value corresponding to the VLAN port 221/222 that receives the RA message, and transmits the RA message to the switch 21. Upon receiving the RA message, the switch 21 transmits the RA message to the selected LAN port 111/112 according to the value of the VLAN tag added to the RA message, and thus the RA message can be received by the IPV6 user device connected to the selected LAN port 111/112. Furthermore, the switch 21 can delete the VLAN tag added to the RA message before transmitting the RA message to the selected LAN port 111/112 to decrease data processed by the IPv6 user device. In this way, the IPv6 user device receives the IP network address of the first IPv6 island 301. Finally, the IPv6 user device resolves the IP network address of the first IPv6 island 301 to generate corresponding IPv6 addresses. With these IPv6 addresses, the IPv6 user device can access the first IPv6 island 301 through the gateway device 100 and the first tunnel 201.

If the IPv6 user device is identified as being connected to any port selected from the second port group 12 (e.g., the LAN port 121/122), the processor 50 generates an RA message comprising the IP network address of the second IPv6 island 302, and assigns the VLAN port 223/224 corresponding to the selected LAN port 121/122 to receive the RA message from the bridge 40. The VLAN interface 22 adds a VLAN tag with a predetermined value corresponding to the VLAN port 223/224 that receives the RA message, and transmits the RA message to the switch 21. Upon receiving the RA message, the switch 21 transmits the RA message to the selected LAN port 121/122 according to the value of the VLAN tag added to the RA message, and thus the RA message can be received by the IPV6 user device connected to the selected LAN port 121/122. Furthermore, the switch 21 can delete the VLAN tag added to the RA message before transmitting the RA message to the selected LAN port 121/212 to decrease data processed by the IPv6 user device. In this way, the IPv6 user device receives the IP network address of the second IPv6 island 302. Finally, the IPv6 user device resolves the IP network address of the second IPv6 island 302 to generate corresponding IPv6 addresses. With these IPv6 addresses, the IPv6 user device can access the second IPv6 island 302 through the gateway device 100 and the second tunnel 202.

According to the method as detailed above, the LAN ports 111, 112, 121, 122 have special VLAN tag values and traffic classes, respectively. When more than one of the LAN ports 111, 112, 121, 122 are respectively connected to different IPv6 user devices (not shown), each IPv6 user device connected to the gateway device 100 sends RS messages with its corresponding VLAN tag value and traffic class to the processor 50, and receives corresponding RA messages from the processor 50. Thus, the processor 50 can distinguish the RS and RA messages of all the IPv6 user devices connected to the gateway device 100 according to their VLAN tag values and traffic classes. In this way, the IPv6 user devices connected to the gateway device 100 can synchronously access either of the first and second IPv6 islands 301, 302, or respectively access the first IPv6 island 301 and the second IPv6 island 302, according to the port group 11/12 which includes the LAN port 111/112/121/122 connected to each of the IPv6 user devices.

In the present disclosure, each of the port groups 11, 12 can include more LAN ports (not shown) for being connected to IPv6 user devices in the IPv4 sea 200. Correspondingly, the VLAN interface 20 can include more VLAN ports (not shown) to ensure that each LAN port has a corresponding VLAN port. When an IPv6 user device (not shown) is connected to any LAN port of the port group 11/12, the gateway device 100 enables the IPv6 user device to access the IPv6 island 301/302 according to the method as detailed above. Furthermore, if only each LAN port and its corresponding VLAN port are enabled to receive/transmit their corresponding RS/RA messages according to above methods, a plurality of IPv6 user devices connected to the gateway device 100 can synchronously access either of the first and second IPv6 islands 301, 302, or respectively access the first IPv6 island 301 and the second IPv6 island 302, according to the port group 11/12 which includes the LAN port connected to each of the plurality of IPv6 user devices.

The LAN interface 10 can further include more port groups (not shown) for being connected to IPv6 user devices and communicating the IPv6 user devices connected thereto with more IPv6 islands (not shown). Correspondingly, the VLAN interface 20 can include more VLAN ports (not shown) to ensure that each LAN port has a corresponding VLAN port.

More tunnels (not shown) can be built in the IPv4 sea 200 for communicating the gateway device with the additional IPv6 islands. According to the method as detailed above, if only each LAN port and its corresponding VLAN port are enabled to receive/transmit their corresponding RS/RA messages according to above methods, an IPv6 user device connected to any LAN port of any port group of the gateway device 100 can access an IPv6 island corresponding to the port group, and a plurality of IPv6 user devices connected to the gateway device 100 can synchronously access the same IPv6 island or respectively access different IPv6 islands communicating with the gateway device 100, according to the port groups which includes the LAN port connected to each of the plurality of IPv6 user devices.

The gateway device 100 can further includes a Wireless Fidelity (WIFI) port 123 and a WIFI interface 60, such that IPv6 user devices (not shown) in the IPv4 sea 200 can access any one selected from the IPv6 islands communicating with the gateway device 100 (e.g., the IPv6 island 301/302) through the WIFI port 123 and the WIFI interface 60. The WIFI interface 60 is connected to the bridge 40. The WIFI port 123 corresponds to the WIFI interface 60 and can be added to the port group corresponding to the selected IPv6 island. In this embodiment, the second IPv6 island 302 is selected as the IPv6 island for using the IPv6 user devices to access which through the WIFI port 123, and thus the WIFI port 123 is added to the second port group 12.

In use, an IPv6 user device (not shown) is connected to the WIFI port 123 and sends an RS message. The RS message is transmitted to the processor 50 through the WIFI interface 60 and the bridge 40. Since the RS message is not transmitted through the switch 21 and the IP header modifier 30, no VLAN tag is added to the RS message, and traffic class of the RS message is not edited. Upon receiving the RS message with no VLAN tag and no edited traffic class, the processor 50 directly identifies that the RA message comes from the IPv6 user device connected to the WIFI port 123. Thus, the processor 50 generates an RA message comprising the IP network address of the selected IPv6 island (i.e., the second IPv6 island 302) in the IP4 sea 200, and then assigns the WIFI interface 60 as the output interface to transmit the RA message to the IPv6 user device connected thereto. The IPv6 user device connected to WIFI port 123 then receives the IP network address from RA message, resolves the IP network address of the second IPv6 island 302 to generate corresponding IPv6 addresses, and accesses the second IPv6 island 302 through the gateway device 100 and the second tunnel 202 according to these IPv6 addresses. Furthermore, the IPv6 user device connected to the WIFI port 123 and all IPv6 user devices connected to the LAN ports of the gateway device 100 can synchronously access the same IPv6 island or respectively access different IPv6 islands communicating with the gateway device 100, according to the port groups including the WIFI port and the LAN ports connected to the IPv6 user devices.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A gateway device, comprising:
a local area network (LAN) interface including a plurality of LAN ports;
a processor connected to the LAN interface; and
a virtual local area network (VLAN) module connected to the LAN interface and a computer; the VLAN module including a switch and a VLAN interface, the VLAN interface including a plurality of VLAN ports corresponding to the LAN ports; and
an Internet Protocol (IP) header modifier connected to the VLAN module and the processor;
wherein the gateway device communicates with an Internet Protocol Version 4 (IPv4) network and at least two Internet Protocol Version 6 (IPv6) networks, and all the plurality of LAN ports are classified into a plurality of port groups corresponding to the at least two IPv6 networks; when an IPv6 user device is connected to any one of the plurality of LAN ports, the processor identifies the LAN port connected to the IPv6 user device, and enables the IPv6 user device to access the IPv6 network corresponding to the port group which includes the LAN port connected to the IPv6 user device;
wherein when a plurality of IPv6 user devices in the IPv4 network are respectively connected to some or all of the plurality of LAN ports, the processor identifies the LAN ports connected to these IPv6 user devices, and enables these IPv6 user device to respectively access the IPv6 networks corresponding to the port groups which include the LAN ports connected to these IPv6 user devices;
wherein when a plurality of IPv6 user devices in the IPv4 network are respectively connected to some or all of the plurality of LAN ports, each of the plurality of IPv6 user device sends a Router Solicit (RS) message to the switch through the LAN port connected to the IPv6 user device; the switch adds a VLAN tag with a predetermined value corresponding to the LAN port connected to the IPv6 user device to the RS message, and transmits the RS message with the VLAN tag to the VLAN port corresponding to the LAN port connected to the IPv6 user device;
wherein the IP header modifier receives the RS messages with the VLAN tags from the VLAN interface and edits the values of traffic class fields of the RS messages according to their VLAN tag values, such that each of the RS messages is in a traffic class corresponding to its VLAN tag value, and further corresponding to the LAN port that receives the RS message; and
wherein the processor receives the RS messages in the edited traffic classes, detects the VLAN tag values of the RS messages according to their traffic classes, identifies and the LAN ports receiving the RS messages according to the VLAN tag values of the RS messages, and thereby identifies the LAN ports connected to the IPv6 user devices and enables the IPv6 user devices to respectively access the IPv6 networks corresponding to the port groups which include the LAN ports connected to these IPv6 user devices.

2. The gateway device as claimed in claim 1, wherein when identifying the LAN ports connected to the IPv6 user devices, the processor generates Router Advertisement (RA) messages comprising IP network addresses of the IPv6 networks corresponding to the port groups which include the LAN ports connected to the IPv6 user devices, and transmits the RA messages to the IPv6 user devices through the VLAN module and the LAN interface; each of the IPv6 user devices resolves the IP network address of the IPv6 network corresponding to the port group which includes the LAN port connected to the IPv6 user device to generate corresponding IPv6 addresses, and accesses the IPv6 network corresponding to the port group which includes the LAN port connected to the IPv6 user device according to these IPv6 addresses.

3. The gateway device as claimed in claim 2, wherein the processor assigns the VLAN ports corresponding to the LAN ports connected to the IPv6 user devices to send the RA messages to the switch, the VLAN interface adds VLAN tags with predetermined values corresponding to the VLAN ports connected to the IPv6 user devices to the RA messages and transmits the RA messages to the switch, the switch transmits the RA message to the LAN ports according to the values of the VLAN tags added to the RA messages, such that the RA messages are received by the IPV6 user devices connected to the LAN ports.

4. The gateway device as claimed in claim 3, wherein the switch deletes the VLAN tags added to the RA messages by the VLAN interface before transmitting the RA message to the LAN ports according to the values of the VLAN tags added to the RA messages.

5. The gateway device as claimed in claim 4, further comprising a bridge connected to the processor and the IP header modifier to transmit the RS and RA messages.

6. The gateway device as claimed in claim 5, further comprising a Wireless Fidelity (WIFI) interface connected to the bridge and a WIFI port connected to the WIFI interface; wherein the WIFI port is classified into any of the port groups, when an IPv6 user device in the IPv4 network is connected to the WIFI port, the processor enables the IPv6 user device to access the IPv6 network corresponding to the port group which includes the WIFI port.

7. The gateway device as claimed in claim 6, wherein when the IPv6 user device in the IPv4 network is connected to the WIFI port, the IPv6 user device sends an RS message, and the RS message is transmitted to the processor through the WIFI interface and the bridge, without any VLAN tag and edited traffic class; when receiving the RS message without any VLAN tag and edited traffic class, the processor identifies that the RS message comes from the IPv6 user device connected to the WIFI port and generates an RA message comprising the IP network address of the IPv6 network corresponding to the port group which includes the WIFI port in the IPv4 network; the RA message is transmitted to the IPv6 user device through the bridge, the WIFI interface, and the WIFI port; the IPv6 user device resolves the IPv6 network corresponding to the port group which includes the WIFI port to generate corresponding IPv6 addresses, and accesses the IPv6 network according to these IPv6 addresses.

* * * * *